Dec. 7, 1965     C. G. TAYLOR     3,221,862
COIN METERING APPARATUS FOR MULTIPLE MACHINE INSTALLATIONS
Filed April 29, 1963     8 Sheets-Sheet 1
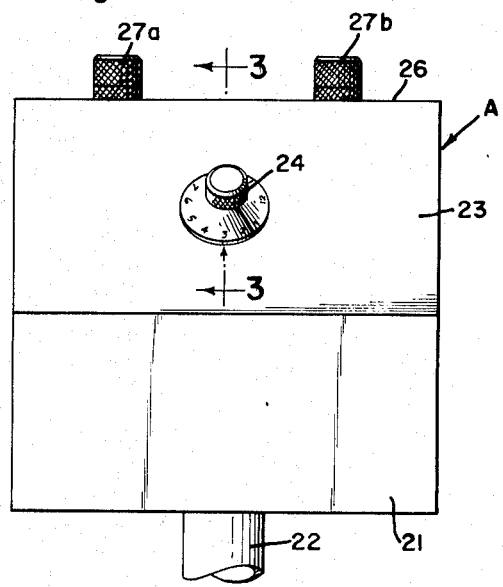
Fig. 1.
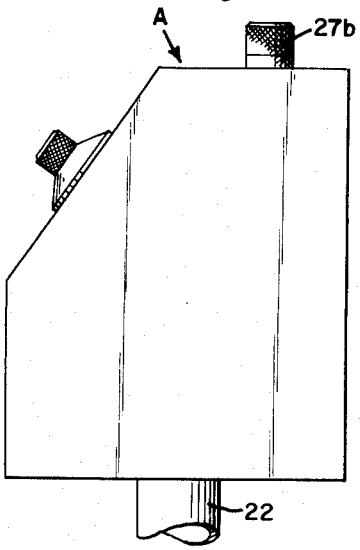
Fig. 2.
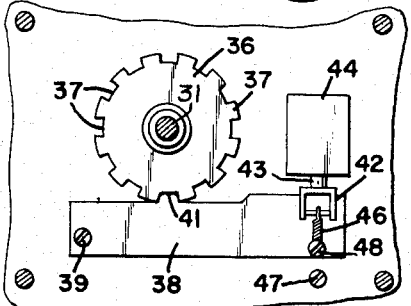
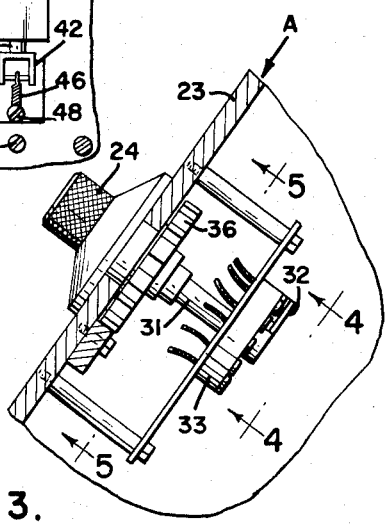
Fig. 5.
Fig. 3.
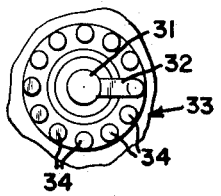
Fig. 4.
INVENTOR.
Christopher G. Taylor
BY
Julian Caplan
attorney Dec. 7, 1965 C. G. TAYLOR 3,221,862
COIN METERING APPARATUS FOR MULTIPLE MACHINE INSTALLATIONS
Filed April 29, 1963 8 Sheets-Sheet 2
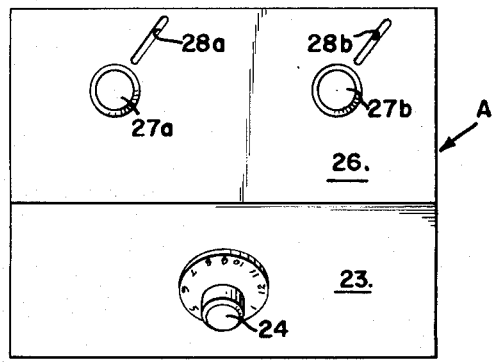
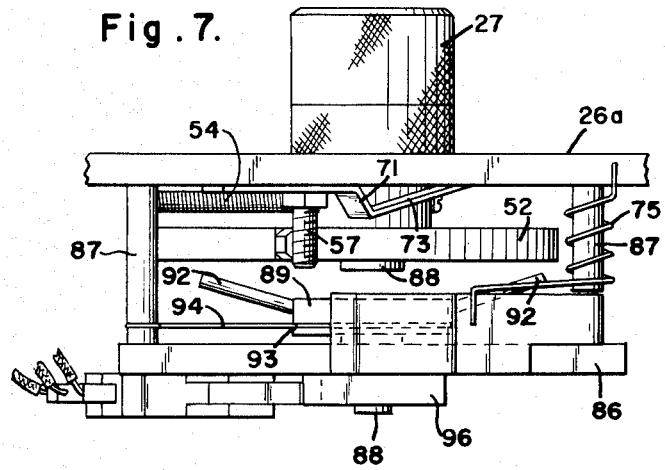
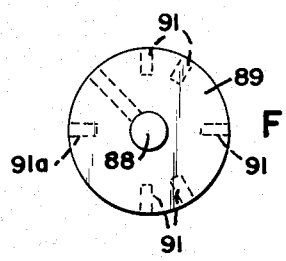
INVENTOR.
Christopher G. Taylor
BY Dec. 7, 1965  C. G. TAYLOR  3,221,862
COIN METERING APPARATUS FOR MULTIPLE MACHINE INSTALLATIONS
Filed April 29, 1963  8 Sheets-Sheet 3
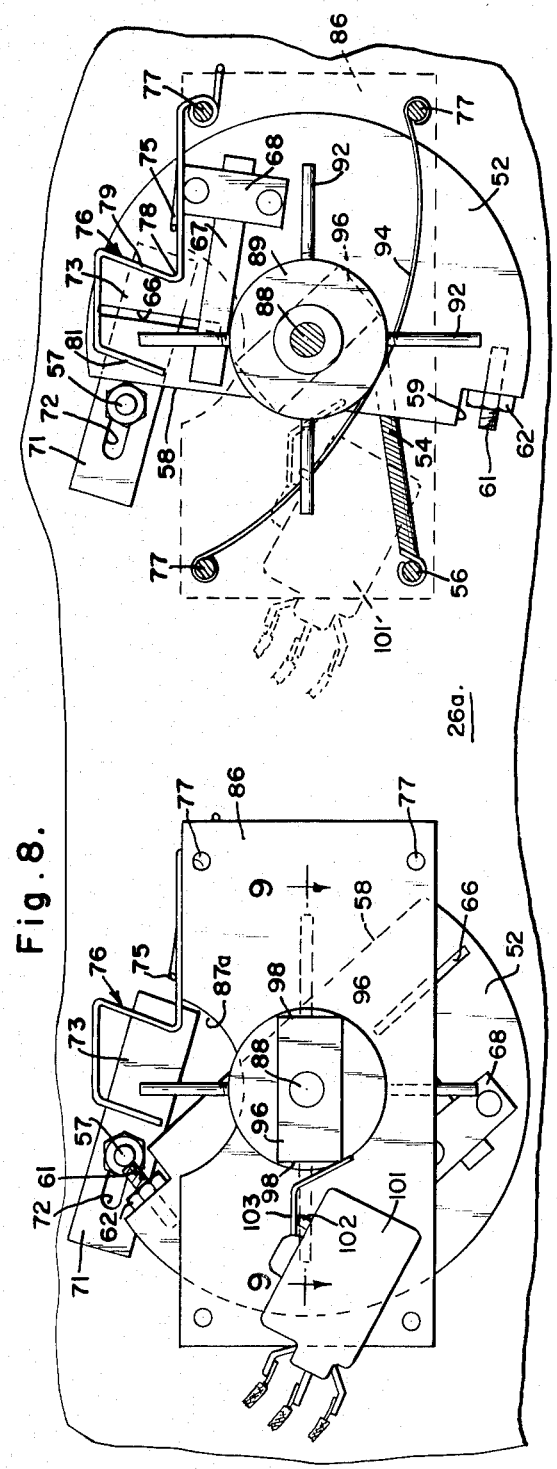
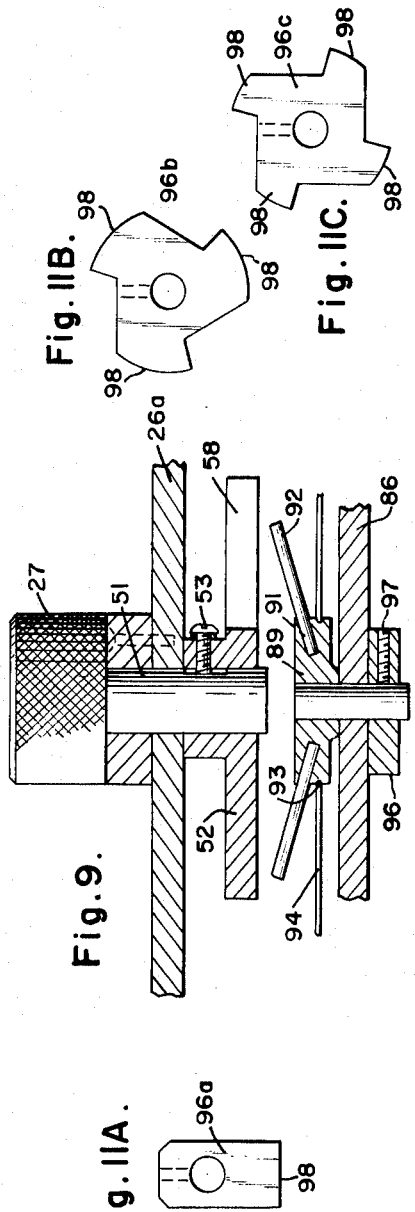
INVENTOR.
Christopher G. Taylor
BY
*Julian Caplan*
   *attorney*

Dec. 7, 1965                C. G. TAYLOR                3,221,862
         COIN METERING APPARATUS FOR MULTIPLE MACHINE INSTALLATIONS
Filed April 29, 1963                                8 Sheets-Sheet 4

INVENTOR
Christopher G. Taylor
BY
Julian Caplan
attorney

Dec. 7, 1965  C. G. TAYLOR  3,221,862
COIN METERING APPARATUS FOR MULTIPLE MACHINE INSTALLATIONS
Filed April 29, 1963  8 Sheets-Sheet 5

INVENTOR
Christopher G. Taylor
BY
Julian Caplan
attorney

Dec. 7, 1965   C. G. TAYLOR   3,221,862
COIN METERING APPARATUS FOR MULTIPLE MACHINE INSTALLATIONS
Filed April 29, 1963   8 Sheets-Sheet 6
Fig. 17.
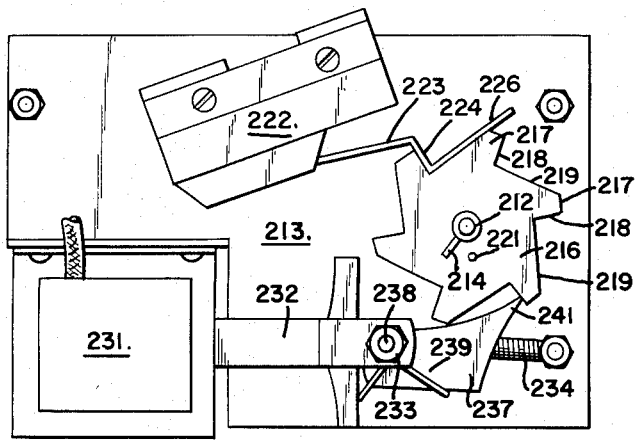
Fig. 17a
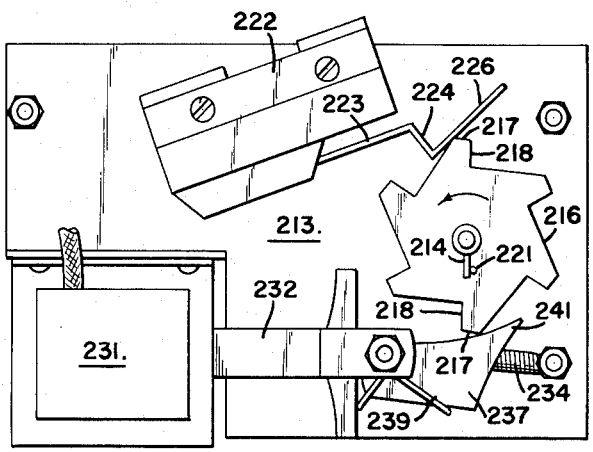
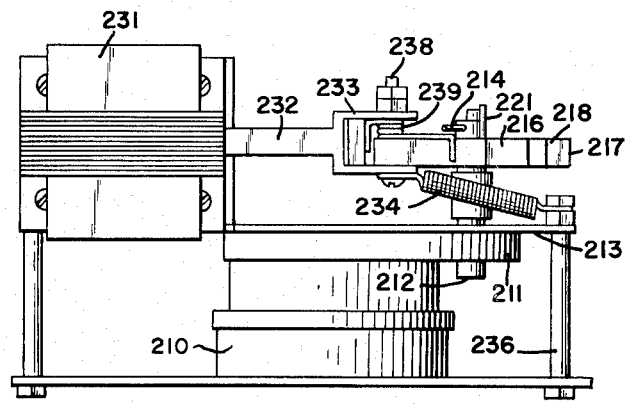
Fig. 18.
INVENTOR
Christopher G. Taylor
BY
*Julian Caplan*
attorney Dec. 7, 1965      C. G. TAYLOR      3,221,862
COIN METERING APPARATUS FOR MULTIPLE MACHINE INSTALLATIONS
Filed April 29, 1963      8 Sheets-Sheet 7
Fig. 19.
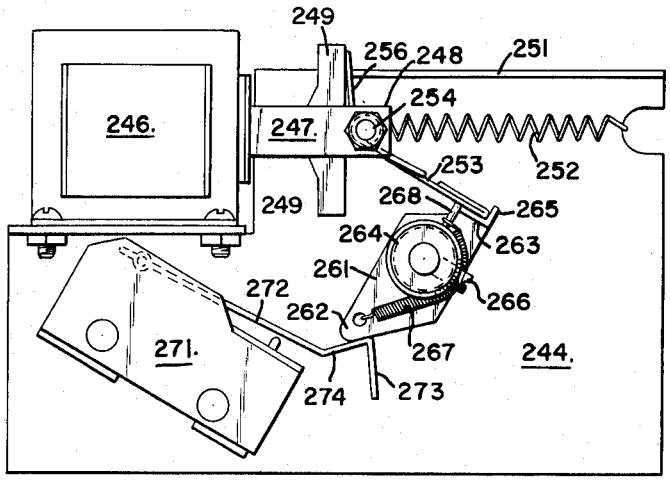
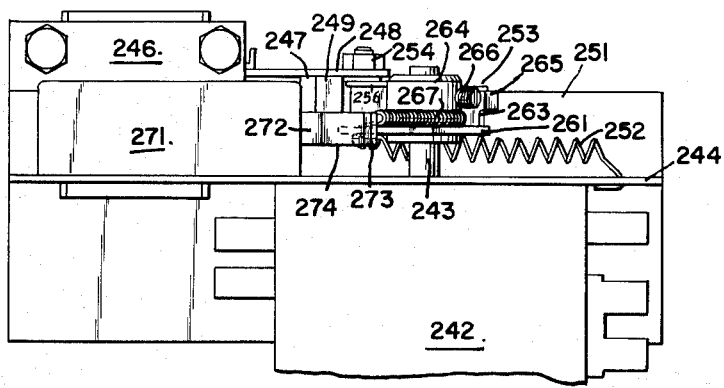
Fig. 20.
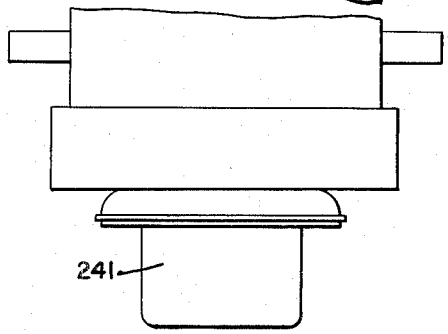
INVENTOR
Christopher G. Taylor
BY Julian Caplan
attorney Dec. 7, 1965   C. G. TAYLOR   3,221,862
COIN METERING APPARATUS FOR MULTIPLE MACHINE INSTALLATIONS
Filed April 29, 1963   8 Sheets-Sheet 8

INVENTOR
Christopher G. Taylor
BY
Julian Caplan
attorney

United States Patent Office 3,221,862
Patented Dec. 7, 1965

3,221,862
COIN METERING APPARATUS FOR MULTIPLE MACHINE INSTALLATIONS
Christopher G. Taylor, South San Francisco, Calif., assignor to Service Distributors, Inc., San Francisco, Calif.
Filed Apr. 29, 1963, Ser. No. 276,514
9 Claims. (Cl. 194—84)

This invention relates to a new and improved coin metering apparatus for multiple installations and is a continuation-in-part of copending application No. 199,919, filed June 4, 1962, for a coin metering device, now Patent No. 3,140,766.

Washing machines, driers, and dry cleaning machines are frequently installed in locations where attendants are not usually present and hence the provision of a coin metering device which is accurate and which prevents operation of the machines by dishonest patrons is of considerable importance. Where such machines are installed in groups and wherein the patron selects one of a group of similar machines for use, the present invention is particularly suitable. Thus in accordance with one form of the invention hereinafter described in detail there is provided at a central location in the room in which the machines are installed a console having a selector switch whereby the patron may select any of a group of machines for use plus a coin slot and coin metering device whereby the patron inserts the required number of coins to start the machine. As a further feature of the invention such coin metering apparatus may be so constructed that the patron may install coins for more than one time cycle as desired, it being understood that particularly in connection with clothes driers the type of fabric and other considerations may make it desirable to dry the clothes for several cycles. The present invention comprises an apparatus which may be used to satisfy all of the foregoing requirements and which have considerable advantages over all the coin metering devices previously used for similar purposes.

A particular advantage of the present invention is the fact that the coin metering mechanism may be adjusted by an attendant so that it will start a machine upon deposit of either a single coin or any desired plurality of coins and that by simple adjustment of the device the number of coins required for such purpose may be altered. Assuming that the coin slot is selected of such dimension that it will accept a 25-cent piece, the mechanism hereinafter described has removable pins in its construction which may be added or removed so that the machine starts after the deposit of one, two, three or four quarters or more as desired. The adjustment heretofore mentioned may be made at the site of the machines and does not require removing the device or any portion thereof for servicing at a central servicing center or repair shop. The alteration may be made by relatively unskilled labor and without the use of special tools or equipment.

A further advantage of the invention is the fact that the apparatus is very simple in operation and consists of a few parts which are of rugged construction resulting in a device which is inexpensive to produce, maintain and repair.

Still another feature of the invention is the fact that means is provided so that a dishonest patron cannot actuate the timer mechanism and then by manipulation of the device obtain a return of one or more coins. Further, means is provided to prevent intentional or unintentional vibration of the machine which would result in advancing the coin device so that fewer coins than the desired number energize the machine. Another advantage of the invention is the fact that provision is made whereby a dishonest patron cannot by manipulation of the switches energize a plurality of machines upon deposit of coins for sufficient to start a single machine. Provision is also made so that coins smaller than the coin to be used as a basis for energization of the machine are rejected and coins larger than such desired coin are not accepted by the device.

A particular advantage of the present invention is the fact that the point at which the coins are deposited may be located centrally and remote from the individual machine to be controlled thereby, this central point being more readily visible and hence dishonest patrons are more likely to be detected.

A still further advantage of the invention is that there is no mechanical connection between the coin mechanism and the timer for the machine. It will be understood that such timers are quite delicate and when abused are quite likely to become inaccurate or inoperative. The absence of mechanical connection between the coin deposit mechanism and the timer reduces the mechanical shock and wear which tends to harm the switches, timers, and relays which are used on the individual machines. No matter how the patron abuses the coin deposit mechanism, damage to the timer is avoided.

A still further feature of the invention is the elimination of electrical relays in the circuitry whereby the coin mechanism controls actuation of the individual machine. Such relays, particularly in the damp atmosphere in which washing machines are usually installed, tend to create service problems which are largely eliminated by reason of the installation of the invention hereinafter described.

Another feature of the coin deposit mechanism hereinafter described is the fact that the coin itself is the mechanical connection between the turning knob which the patron turns after depositing the coin and the cam which energizes a switch. The switch is connected to a solenoid at the individual machine selected which solenoid is energized upon turning of the control knob. The solenoid is so connected into the timing mechanism of the individual machine that only when the coin drops out of its holder and into the coin deposit box is the machine actuated. Thus when the coin tends to stick in the coin deposit mechanism the energization of the plurality of machines is not accomplished.

A still further feature of the invention is the provision of an interlock in the control knob whereby the patron selects the desired machine for operation so that when one of the machines is energized the control knob is locked against movement thereby preventing the patron from, upon deposit of a single coin or coins, rapidly manipulating the selector switch so as to energize a plurality of machines.

Other objects of the present invention will become apparent upon reading the following specification and referring to the accompanying drawings in which similar characters of reference represent corresponding parts in each of the several views.

In the drawings:

FIG. 1 is a front elevation of the console of a coin control mechanism in accordance with the present invention.

FIG. 2 is a side elevation thereof.

FIG. 3 is an enlarged fragmentary section substantially along line 3—3 of FIG. 1.

FIG. 4 is a fragmentary view along line 4—4 of FIG. 3.

FIG. 5 is a fragmentary sectional view substantially along line 5—5 of FIG. 3.

FIG. 6 is a top plan of the structure of FIG. 1.

FIG. 7 is an enlarged side elevation of the coin control mechanism.

FIG. 8 is a bottom plan of the underside of the coin control of FIG. 6.

FIG. 9 is a fragmentary sectional view taken substantially along line 9—9 of FIG. 8.

FIG. 10 is a plan of a clutch disc used in the coin control mechanism.

FIGS. 11A, 11B and 11C are plans of different cams which may be used alternatively in the mechanism.

FIG. 17 is a fragmentary top plan of a further modification in which the coin control is directly mounted on a timer of the drier type.

FIG. 17A is a fragmentary view of the structure of FIG. 17 in a different position in its cycle.

FIG. 18 is a side elevation of the structure of FIG. 17.

FIG. 19 is a fragmentary top plan of a switch mechanism mounted on a washing machine and used with the structure of FIGS. 1 to 11.

FIG. 20 is a side elevation of the structure of FIG. 19.

Figure 12:
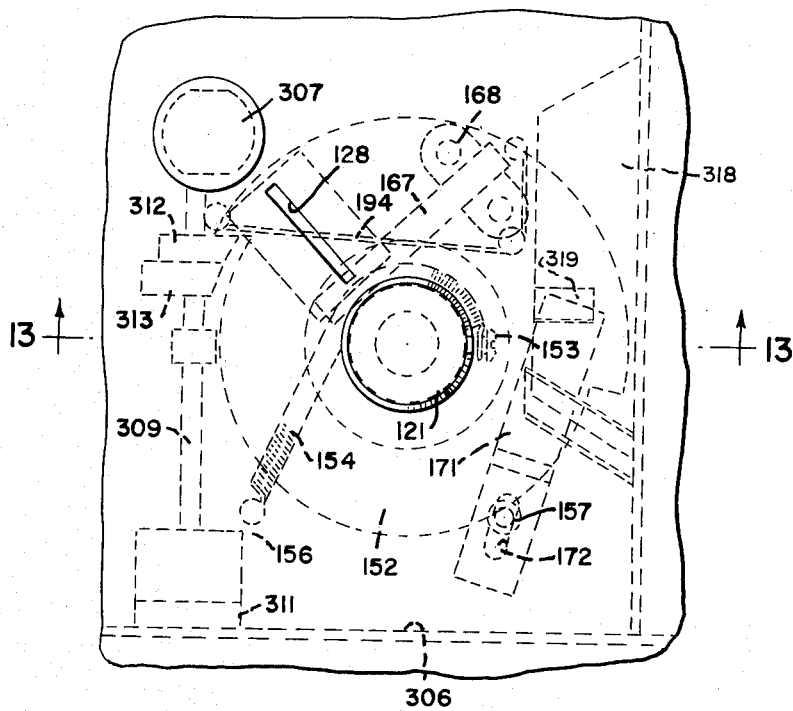
FIG. 12 is a fragmentary top plan of a modification in which the coin control is directly mounted on a timer of the washing machine type.
Figure 13:
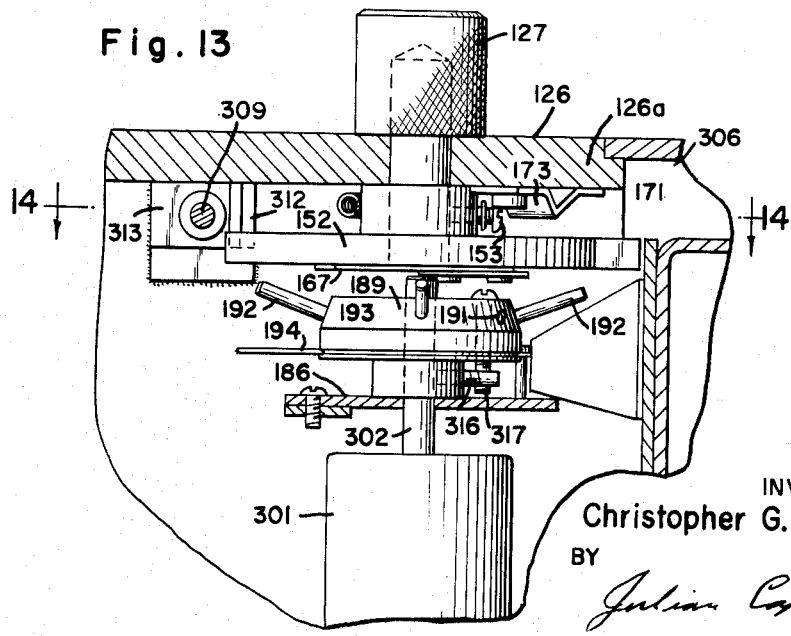
FIG. 13 is a vertical section taken substantially along line 13—13 of FIG. 12.
Figure 14:
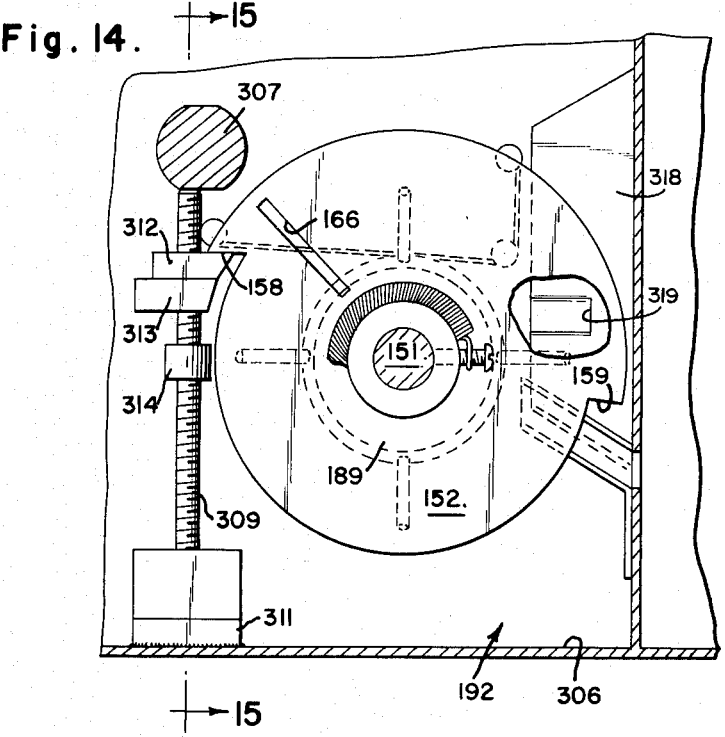
FIG. 14 is a fragmentary section taken along line 14—14 of FIG. 13.
Figure 15:
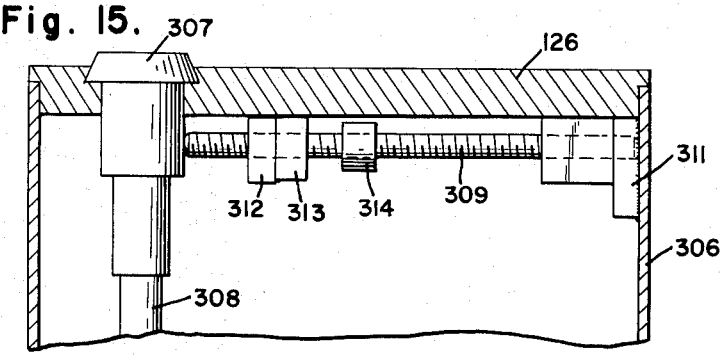
FIG. 15 is a sectional view taken along line 15—15 of FIG. 14.
Figure 16:
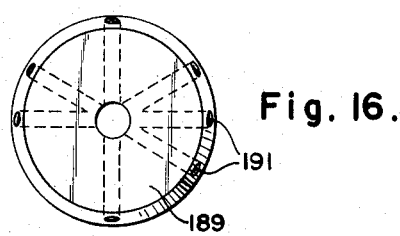
FIG. 16 is a plan of a clutch used in the mechanism of FIGS. 12 to 15.

In one form of the invention herein illustrated a central control cabinet or console A is provided having a selector switch whereby the deposit of a coin or coins may be arranged to actuate any one of a plurality of machines located remote from the console. Thus assuming the invention is installed in a laundry room of an apartment house, a coin-operated laundry, or the like, the patron selects a particular washing machine (or drier or the like) for deposit of clothes and thereupon sets a selector switch for connection with that particular machine. Thereupon the patron deposits in a coin deposit mechanism B on console A one or more coins which have been predetermined as required to actuate the machine for a cycle. Deposit of the coins actuates either a dryer type switch mechanism C or washer type switch mechanism D located at the respective machine selected which starts operation of the machine.

In another form of the invention, the coin mechanism E is directly connected to timing mechanism and relays for a single machine as distinguished from selection of multiple machines, but much of the coin mechanism of this form of the invention is similar to a portion of the mechanism previously described.

For convenience the following specification of the invention is divided into sections.

A. *Control console for multiple selection and selector switch*

As illustrated in FIGS. 1 to 5 inclusive, there is provided a control console 21 mounted on a stanchion 22 or the like at a convenient location in the room in which a plurality of machines such as washing and drying machines are located. On a slanted front panel 23 of the console is a selector dial 24 which is manually turned to control actuation of any of a plurality of machines, here being shown as twelve in number. It will be understood that more or fewer machines can be thus controlled. On the top 26 are coin mechanism control knobs 27a, 27b in proximity to coin deposit slots 28 into which one or more coins may be deposited. The knobs 27a, 27b are used alternately and are preferably wired into the circuit in parallel so that the patron may use either one or the other of the coin slots 28 and associated knob 27, the other slot and knob being a standby facility.

The patron first turns the selector knob 24 to an indication of the desired machine as marked on cooperating indicia on panel 23 and knob 24. Knob 24 is directly connected to a shaft 31 which turns the central rotatable contact arm 32 of multiple switch 33. Switch 33 has a plurality of stationary contacts 34, each wired to one of the machines.

Likewise, fixed for rotation with shaft 31 is an index disk 36 formed with peripheral dovetail shaped notches 37 corresponding in number and angular displacement with the contact points 34. An index stop or lever 38 is mounted by means of pivot 39 to panel 23 and has at about the midpoint of one edge thereof a finger 41 shaped to fit into one, but one only, of the notches 37. Travel of stop 38 is limited by screw stop 47. The end of stop 38 opposite pivot point 39 is connected by means of clevis 42 to the armature 43 of solenoid 44. Spring 46 is connected to clevis 42 at one end and the other end is fixed externally of stop 38 by means of screw 48. Solenoid 44 is wired in series with switch 33 with the result that stop finger 41 fits into one of the notches 37 after the patron has once turned the dial 24 and prevents dial 27 from turning while the coin mechanism is energizing the timer mechanism of a particular machine. This arrangement prevents a dishonest patron from depositing one or more coins sufficient to energize one machine and then by rapid manipulation of knob 27 energizing a plurality of machines.

B. *Coin deposit mechanism*

This portion of the present invention is a modification and continuation-in-part of that shown in copending application S.N. 199,919 filed June 4, 1962, now Patent No. 3,140,766. The slot 28 in top 26 has a length and width to accept coins no larger than a pre-determined size, here assumed to be a United States 25-cent piece. By changing the dimensions of slot 28 the device may be adapted to receive coins of other denominations. From time to time it is desirable to adjust the machine so that it will operate on one 25-cent piece, two 25-cent pieces or three 25-cent pieces or the like, and it is a feature and advantage of the machine that this adjustment may be made rapidly by unskilled workmen in the field.

Control knob 27 is manually actuated by turning in a clockwise direction through an angular travel of approximately 120°. Knob 27 has a spindle 51 fixed thereto which projects interiorly of top 26 and carries turntable 52 fixed thereto by means of set screw 53. A garter spring 54 is fixed by means of pin 56 at one end to the underside of top mounting plate 26a fixed to the underside of top 26 and by means of screw 53 at its other end to turntable 52. The function of spring 54 is to return knob 27 and turntable 52 to starting position, that is, the position shown in the lefthand side of FIG. 8. Turntable 52 turns through an angle of 120°, said angle being limited by reason of screw 57 projecting from top mounting plate 26a and restraining further turning movement. Thus turntable 52 is formed with one chordal trailing edge 58 which contacts screw 57 as is shown in the righthand part of FIG. 8. Approximately 120° from the edge 58 is a step 59 cut into the edge of turntable 52 and having projecting therefrom an adjustable screw 61 threaded into turntable 52 and held in place by a lock nut 62. Screw 61 also contacts pin 57 and may be adjusted to limit the angular movement of the turntable in one direction of rotation so that coin slot 66 in turntable 52 may register immediately below slot 28 so that a coin dropped through slot 28 fits into slot 66.

A flat leaf metering spring 67 held in position on the underside of turntable 52 by adjustable bracket 68 extends across one end of slot 66. Spring 67 tends to retain a coin approximately upright in slot 66 so that when turntable 52 is twisted, the coin moves with the turntable until it is forcibly dislodged therefrom by flexure of spring 67.

At a position approximately 120° from the position of rest of slot 66 is coin dislodging cam 71 of irregular shape fixed to the underside of top plate 26a by screw 57. Cam 71 has an elongated slot 72 through which screw 57 fits so that it may be adjusted in position. Cam 71 has an elongated ramp 73 which slants downwardly so that as a coin is carried around in slot 66 in turntable 52 it contacts ramp 73 and the cam pushes the coin downwardly out of slot 66, spring 67 flexing to accommodate escape of coin and also to start its initial movement downward to a coin box (not shown).

To prevent a dishonest patron from manipulating the device to energize the switch and return the coin, an irregularly shaped coin stop blade 76 is positioned adjacent ramp 73. Blade 76 is pivotally mounted about one of the screws 77 carried by mounting plate 86 which passes through an eye on the remote end thereof. Blade 76 is biased into position by helical tension spring 75. Blade 76 has a corner 78 in the path of a coin turned by turntable 52 so positioned that blade 76 flexes out of the way to permit passage of the coin but spring 75 returns the blade to normal position as soon as the cam clears. A shoulder 79 on blade 76 is interposed behind the coin after it has been turned to the limit of its movement, the shoulder 79 being approximately radially disposed with respect to the axis of revolution of the turntable 52. Hence, if the coin sticks in slot 66 or if the patron attempts by rapid manipulation to actuate the mechanism and retract the coin before it has a chance to drop into the chute, blade 76 prevents return of the coin to starting position. A second shoulder 81 is formed on blade 76 to interfere with over-travel of the coin beyond its normal maximum position of travel and insure the coin dropping into the coin box (not shown).

Below turntable 52 is a mounting plate 86 suspended from the underside of top mounting plate 26a by one of mounting screws 77 and spacer 87. Plate 86 is cut away as indicated by reference numeral 87a to permit coins to drop below ramp 73. Mounted for rotation in plate 86 in alignment with spindel 51 is a stub shaft 88 which carries rotor 89. Formed in the periphery of rotor 89 is a plurality of threaded holes 91 slanted upwardly and outwardly to receive drive pins 92. As shown in FIG. 10 there are six such holes 91, four being located each 90° apart and two being spaced 120° each from one of the other holes. At least one pin 92 is at all times threaded into one hole herein designated 91a. The additional number of pins 92 used depends upon the number of coins which the machine is pre-set to require before the washing machine or drier is actuated. Thus, the machine may be adjusted to require one, two, three or four coins, the proper holes 91 for insertion of pins 92 being selected, depending upon such choice. A groove 93 is formed in the periphery in rotor 89 and a snubber spring 94 held in place by screws 77 fits in the groove and prevents over-travel of rotor 89.

Mounted on shaft 88 below plate 86 is one of several selectable and removable cams 96 held in place by a set screw 97. Thus, as shown in FIG. 11A, the periphery of cam 96a is formed with one high dwell 98, whereas in FIG. 11B cam 96b is formed with three peripheral high dwells 98 and in FIG. 11C cam 96c is formed with four high dwells 98. Cam 96 (FIG. 8) is formed with two high dwells 98. The number of coins to be used determines the selection of the proper cam 96, 96a, 96b, 96c and number of pins 92 required. For a single coin, cam 96b with three high dwells 98 and three pins 92 in rotor 89 are used. For two coins, cam 96 with two high dwells and four pins 92. For three coins, cam 96a with one high dwell and three pins 92. For four coins, cam 96a with one high dwell and four pins 92.

Mounted on the underside of plate 86 is a micro-switch 101 having a switch actuating contact 102 and having in proximity thereto a cam follower blade 103, the outer end of which projects in the path of dwells 98. When blade 103 is moved by the high dwell of a cam 96, contact 102 is retracted thereby closing switch 101. When the turntable 52 approaches the end of its angular travel, the high dwell of the cam closes switch 101 and the latter remains closed until the turntable is turned to the limit of its travel, which insures that the coin is discharged from its slot 66, whereupon the low dwell of the cam enables switch 101 to open. As hereinafter explained, mechanisms C and D start their respective machines only when switch 101 has been first closed and then opened. Hence, the machines cannot start until the coin has been dropped out of slot 66. Operation of this portion of the machine is as follows: Assuming that the machine is set to energize one of the washing machines or driers upon deposit of three coins, three pins 92 are in place in holes 91 spaced 120° apart and cam 96 (single high dwell) is fastened to the lower end of shaft 88. Deposit of the first coin in slot 28 and its dropping into slot 66 enables the patron to twist knob 27 through 120° of travel or until adjustment screw 61 contacts screw 57. Such twisting movement of the turntable 52 causes the bottom edge of the coin which is retained in slot 66 by leaf spring 67 to contact the nearest pin 92, thereby turning rotor 89 and cam 96 through an angular travel of 120°. When the coin contacts the ejector 71 it is dropped out of slot 66 and into the coin chute. Spring 54 returns knob 27 to its original position but this does not cause a return movement of rotor 89 because there is no direct connection between turntable 52 and rotor 89 in the absence of a coin in slot 66. Since there is only one high dwell on cam 96, switch 101 is not affected. The foregoing deposit of coins is twice repeated and as the third deposit and twisting of knot 27 approaches completion, high dwell 98 closes and then opens switch 101 and this, in turn, actuates mechanism C or D.

C. *Multiple drier-type switch mechanism*

Where the remote control coin mechanism B previously described is used to energize a machine such as a drier, such a machine has a simple Off/On cycle which is controlled by a timer motor 210 arranged to operate for a pre-determined cycle and then turn off the machine as well as the timer motor. A gear reduction box 211 associated with the timer motor runs a shaft 212 journalled in mounting plate 213. The timer motor and gear reduction themselves are subject to wide variation and their construction is well-known in this art; a full description and illustration thereof is, therefore, omitted. Fixed on the upper end of shaft 212 is radial pin 214. Rotatable with respect to shaft 212 is a star wheel 216 having a plurality of points 217, here shown as six in number. Each point has a special radial shoulder 218 and a flank 219 projecting outwardly from the base of shoulder 218. Wheel 216 carries pin 221 in the path of pin 214. Hence, shaft 212 turns wheel 216 only when pin 214 contacts pin 221, but wheel 216 may be advanced through a greater angular travel, for a purpose hereinafter explained.

Mounted in proximity to star wheel 216 is a micro-switch 222 having its actuating level 223 projecting into the path of rotation of the star wheel. Lever 223 is specially formed and has a shoulder 224 and flank 226 complementary to the shoulder 218 and flank 219 of the star wheel. When a point 217 of lever 223 star wheel 216 holds flank 226 of blade 223 in retracted position (FIG. 17A), switch 222 is open. However, when star wheel 216 is rotated counter-clockwise and shoulder 218 is positioned immediately behind and parallel to shoulder 224 of lever 223 (FIG. 17) switch 222 is closed, thus energizing both the drier and motor 210.

Solenoid 231 mounted with its armature 232 approximately tangential to star wheel 216 is energized upon closing of micro-switch 101 on the console. The outer end of armature 232 has a clevis 233 and is biased outwardly by means of spring 234 fixed at one end to clevis 233 and at the other end to stationary post 236 on plate 213. Between the arms of clevis 233 is pawl 237 pivotally mounted on screw 238 which passes through the arms of clevis 233. A wire torsion spring 239 of irregular shape is partially wrapped around screw 238 and is shaped to bias pawl 237 in a counter-clockwise direction as viewed in FIG. 17.

When solenoid 231 is energized, armature 232 is moved inwardly or to the left as viewed in FIG. 17, pawl 237 moving clockwise around pivot screw 238 to clear the points 217 of star 216 and then returning under influence of spring 239 to normal position. On this retractive movement, by reason of shoulder 218 of star 216 fitting against shoulder 224 of blade 223 there is no clockwise movement of star 216 nor is there any movement of blade 223. When solenoid 231 is de-energized (upon opening of switch 101) spring 234 projects armature 232 causing the point 241 of pawl 237 to engage the shoulder 218 of the next point of star wheel 216 and to rotate the star wheel 60°. Such rotation moves pin 221 in advance of pin 214 by 60°. During this 60° movement blade 223 of switch 222 is deformed from the position shown in FIG. 17, to the position shown in FIG. 17A, and so long as star wheel 216 remains stationary with blade 223, switch 222 remains closed. Closing of switch 222 starts timer motor 210 and causes the drier to operate. When motor 210 operates a sufficient time (i.e., 60° of rotation) to bring pin 214 up against pin 221 and turn star 216 until flank 219 lifts blade 223 to the position shown in FIG 17A, opening switch 222 and this de-energizes timer motor 210 as well as the drier.

If the patron has deposited coins at console A to close and open switch 101 twice, then armature 232 has been retracted and projected twice to turn wheel 216 through 120°. Thus pin 214 does not contact pin 221 until elapse of two time cycles and blade 223 is deformed and returned and switch 222 maintained for two cycles. This feature is important in driers because certain loads of washing require greater drying time than others. With the structure shown in FIGS. 17 and 18, the drier may be energized up to six time cycles.

D. *Multiple washer-type switch mechanism*

Where the remote control coin mechanism B, previously described, is used to energize a machine such as a washing machine, such machine has a motor 241 which drives a relay 242 controlling the cycle of operation of the machine which includes control of admission of water, rotation of the washing drum for washing, rinsing and drying, pumping of waste water, and the like, all as well understood in the automatic washing machine art. The details of motor 241 and relay 242 form no part of the present invention and are broadly disclosed in U.S. Patent No. 2,313,064, as well as others. It will be understood that the details of the construction of such equipment are subject to wide variation and the particular form herein illustrated may likewise be varied. The shaft 243 of the relay 242 extends up through a suitable aperture in mounting plate 244 on the washing machine and upon which the mechanism hereinafter described in detail is mounted and rotates in clockwise direction as viewed in FIG. 19. Mounted on plate 244 is a solenoid 246 which is energized upon closing of switch 101. The outer end of armature 247 of solenoid 246 is formed with a clevis 248 and inwardly of clevis are laterally projecting wings 249. An upturned portion 251 of plate 244 is contacted by one of the wings 249 to limit outward movement of armature 247. Armature 247 is biased toward outward position by means of spring 252 connected at one end to plate 244 and at the opposite end to clevis 248. Cam dog 253 is mounted on clevis 248 by screw 254 passing through eye 256 at the inner end of dog 253. Dog 253 is biased in a direction toward shaft 243 by means of torsion spring 256 wrapped around screw 254 and having one extension engaging armature 247 and another engaging dog 253.

Rotatably mounted on and relative to shaft 243 is cam 261. Cam 261 has an elongated point 262 and, approximately 180° to the rear of point 262, is upturned ear 263 having outward turned shoulder 265. A collar 264 is fixed on shaft 243 by set screw 266 and spring 267 interconnecting collar 246 and cam 261 biases cam 261 in a direction opposite the direction of rotation of shaft 243. Counter-clockwise movement of cam 261 relative to shaft 243 is limited by radial pin 268 on collar 264 engaging ear 263.

Mounted to one side of shaft is micro-switch 271 having switch arm 272 formed with a V-shaped angular extremity having outer surface 273, inner surface 274, and which protrudes into the path of rotation of cam 261. Closing of switch 271 by movement of arm 272 toward shaft 243 energizes timer motor 241.

In operation, the cycle commences with point 262 of cam 261 in contact with outer surface 273 of switch arm 272 so that arm 272 is depressed, switch 271 opened, and thus the machine is stopped. In this position, spring 267 forces ear 263 in contact with pin 268. Upon deposit of coins at coin deposit B, solenoid 246 is energized retracting armature 247 and bringing dog 253 into position behind shoulder 265. Upon de-energization of solenoid 246, spring 252 projects armature 247 and dog 253 pushes cam 261 a few degrees clockwise until point 262 clears outer surface 273 and comes to rest on inner surface 274, so that arm 272 moves outward and starts motor 241. Since dog 253 engages shoulder 265, cam 261 is held against return to initial position, the force of spring 252 being considerably greater than that of spring 267. Energization of motor 241 turns shaft 243 and eventually pin 268 engages behind ear 263, turning cam 261 in clockwise direction through 360° to the initial position, whereupon point 262 engages and depresses surface 263 and stops motor 241. If a dishonest or mischievous patron jars the machine at "off" position so that dog 253 is out of contact with shoulder 265, spring 267 maintains point 262 against outer surface 273, thereby preventing start of the machine. Similarly, jarring during the interval when point 262 contacts inside surface 274 can only result in spring 267 returning cam 261 to initial or "off" position, thus defeating the purpose of the dishonest patron.

E. *Single washing machine actuating mechanism*

Reference is now made to FIGS. 12 to 16 inclusive wherein mechanism similar to that heretofore explained under heading B, coin mechanism, is adapted for a single machine, as distinguished from the use of the console mounting A for multiple machines.

It will be seen that a timer motor and relay 301 is mounted below plate 186. Commercially available timing relays and timing motors are well known in this art; a full description and illustration thereof is, therefore, omitted. Such a motor and relay 301 is started by manual or external mechanical turning of its shaft, through a small angle, such as 30°. Operation continues through the remainder of its cycle, whereupon the relay switch controlling energization of the motor 301 is opened and the timer motor stops. The other relay switches control the cycle of operation of the machine with which the device is used. In the instance of a washing machine, the timer relays control the admission of water, rotation of the washing drum for washing, rinsing and drying, pumping of water and the like, all as well understood in this art.

Cover plate 126 for the mechanism is held in casing 306 on the machine by means of lock 307 having an elongated bolt 308 which screws into a retainer (not shown). Lock 307 also holds in place a transverse threaded bolt 309 which fits into a socket 311 on casing 306 and assists in retaining cover plate 126 in place. Bolt 309 fulfills an additional function in that it is in threaded engagement with first turntable stop nut 312 and its lock nut 313 and second turntable stop nut 314. Stop nuts 313 and 314 are adjustable along bolt 309 and hence the angular travel of turntable 152 between the two positions of its movement may be adjusted.

Many of the parts of mechanism E shown in FIGS. 12–16 are similar in function to parts shown in FIGS. 6–11 and corresponding parts bear the same reference numerals increased by 100. A detailed description of such parts and their function is believed to be unnecessary.

One distinguishing feature of the structure of FIGS. 12–16 is that motor shaft 302 of timer motor and relay is directly connected to this shaft on which rotor 189 is mounted, but rotor 189 is loose on said shaft. Shaft 302 carries radial pin 316 and rotor 189 vertical pin 317.

A somewhat simplified cam stop may be used in this version of the dwell. Blade 318 is mounted on plate 186 and has a shoulder portion 319 bent down into the path of rotation of the coin. Contact of shoulder 319 with the coin causes blade 318 to bend out of the way and then drop behind the coin, preventing its return to a position where it will fail to reach the coin collection box.

Operation of mechanism E is essentially the same as mechanism B insofar as selection of the number of pins 192 in relation to the number of coins required to actuate the machine is concerned. As each coin is inserted and knob 157 turned it advances turntable 152 through 120° and advances rotor 189 a distance dependent on the number of pins 192 in place. The location of pin 317 is such that when the last coin is approaching its discharge position, pin 317 contacts pin 316, thereby turning shaft 302 through the required angle to start motor 301. Motor 301 continues to turn through its timing cycle.

F. Single drier actuating mechanism

Figure 22:
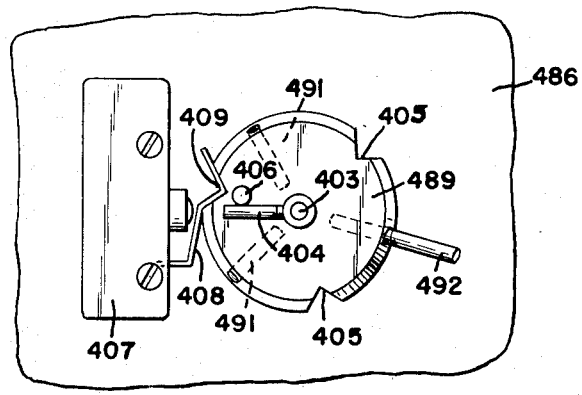
FIG. 22 is a structure sectional view taken substantially along line 22—22 of FIG. 21.
Figure 21:
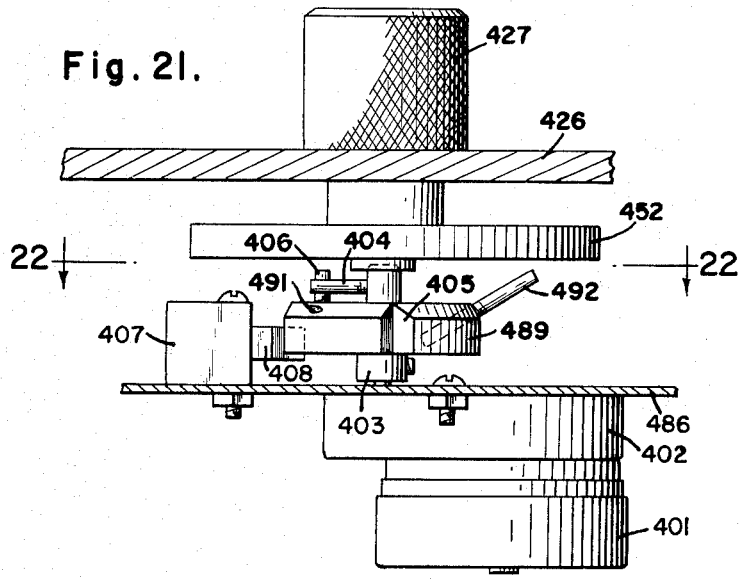
FIG. 21 is a side elevation of a switch mechanism mounted on a drier and used with the structure of FIGS. 1 to 11.

Mechanism whereby coin mechanism as illustrated in FIGS. 7–11 may be connected to control a single machine such as a drier for a time cycle or a plurality of time cycles is shown in FIGS. 21 and 22. Plate 286 carries timer motor 401 driving gear reduction 402 having shaft 403. Rotor 489 is loosely mounted on shaft 403 and is formed with a plurality of holes 491 and from selected holes 491 project pins 492 which may be turned by a coin in the slot of a superimposed turntable 452 in identical manner as heretofore explained.

Radial pin 404 is carried by shaft 403 and drives vertical pin 406 in rotor 489. Rotor 489 has a plurality of cam notches 405 which are V-shaped. Adjacent rotor 489 is switch 407 which controls operation of the drier. Switch 407 has a switch arm 408 formed with a projection 409 mating with notch 405.

Depending upon placement of pins 492, one or more coins deposited sequentially in the turntable of the mechanism will upon turning of the control knob cause rotor 489 to turn 120° or a multiple thereof. When rotor 489 is turned from the position of FIG. 21 to a position where projection 409 is displaced from notch 405, switch 407 is closed, operating the drier and motor 401. When motor 401 operates a sufficient time, pin 404 moves up behind pin 406 and turns rotor 489 until projection 409 drops into the next notch 405, opening switch 407, stopping motor 401 and stopping the drier.

If the patron deposits a sufficient plurality of coins to turn rotor 489 more than one timing cycle, pin 406 is sufficiently in advance of pin 404 so that motor 401 operates twice as long before switch 407 is opened.

What is claimed is:

1. In a device for use in a coin-operated laundry, or the like, of the type having a central console, a plurality of laundry machines, a selective first switch at said console to establish communication between said console and a selected machine, each said machine provided with a timer motor, a second switch mechanism having a solenoid, and a coin-operated switch mechanism at said console, said last-named mechanism comprising a coin deposit slot, manually operated means, and a third switch arranged to be closed upon actuation of said manually operated means when a coin has been deposited in said slot, said first and third switches wired in series to control energizing said solenoid, the improvement which comprises a cam, means for turning said cam, said last named means including a shaft on which said cam is rotatably mounted relative to said shaft and a lost-motion connection between said shaft and said cam, said lost-motion connection turning said cam in one direction of rotation of said shaft and permitting rotation of said cam relative to said shaft in said one direction ahead of the rotation of said shaft, a linkage attached to said solenoid arranged to turn said cam in said one direction ahead of said shaft, and said second switch controlled by said cam and controlling energization of said timer motor, said shaft driven by said timer motor, said third switch when closed by the manually-operated means when a coin has been deposited energizing the solenoid at the particular machine selected by said first switch to advance said cam in said one direction to close said second switch and energize said timer motor, said timer motor continuing energized for an entire cycle despite position of said cam, said improvement characterized by absence of positive connection between said solenoid and said timer shaft to directly advance said timer shaft from said solenoid.

2. The combination of claim 1 which further comprises means for locking said selective first switch against movement when said third switch is closed.

3. The combination of claim 1 which further comprises a rotor mounted below said manually operated means, a plurality of drive pins selectively installed in said rotor, and a cam rotatable with said rotor and having at least one high dwell, said third switch mounted in proximity to said rotor whereby each high dwell of said cam closes said third switch, said manually operated means shaped to carry a coin around on edge, said drive pins being located in the path of coins thus carried whereby upon deposit of each coin and activation of said manually operated means said rotor is turned through a portion of a complete cycle of rotation, said high dwell closing said third switch upon deposit of a pre-determined number of coins and rotation of said manually operated means after each deposit.

4. The combination of claim 3 in which said cam is removable, whereby cams with different numbers of high dwells may be installed in said mechanism whereby the number of coins required to be deposited to activate a machine may be varied by selection of a corresponding cam and installation of a corresponding number of drive pins in said rotor.

5. A device for use in a coin-operated laundry, or the like, a central console, a plurality of laundry machines, a selective first switch at said console to establish communication between said console and a selected machine, each said machine provided with a second switch mechanism having a second switch closed by energy from said console and when closed commencing operation of said machine, and a coin-operated switch mechanism at said console, said last-named mechanism comprising a coin deposit slot, manually operated means, and a third switch arranged to be closed upon actuation of said manually operated means when a coin has been deposited in said slot, said first and third switches wired in series to control closing said second switch, said second switch when closed controlling actuation of said selected machine, said second switch mechanism comprising a solenoid energized upon closing of said first and third switches, a ratchet pawl controlled by said solenoid, a ratchet wheel rotatably mounted and arranged to be advanced by said pawl, said switch mechanism controlled by the position of said ratchet wheel, a timer drive shaft, lost motion means interconnecting said drive shaft and said ratchet wheel, and a timer motor driving said drive shaft, whereby deposit of coins for a single cycle of said timer motor advances said ratchet wheel a set angular distance ahead of said lost motion means to hold said second switch closed for one cycle of the machine and deposit of twice as many coins for a single cycle advances said ratchet wheel twice said set angular distance to hold said second switch closed for two cycles, said lost motion means arranged to turn said ratchet wheel to open said third switch after said timer motor has turned said drive shaft through a number of cycles corresponding to the number of coins deposited.

6. A device for use in a coin-operated laundry, or the like, a central console, a plurality of laundry machines, a selective first switch at said console to establish communication between said console and a selected machine, each said machine provided with a second switch mechanism having a second switch closed by energy from said console and when closed commencing operation of said machine, and a coin-operated switch mechanism at said console, said last-named mechanism comprising a coin deposit slot, manually operated means, and a third switch arranged to be closed upon actuation of said manually operated means when a coin has been deposited in said slot, said first and third switches wired in series to control closing said second switch, said second switch when closed controlling actuation of said machine, said second switch mechanism comprising a solenoid energized upon closing of said first and third switches, a pawl controlled by said solenoid, a rotatable cam arranged to be advanced by said pawl when said cam is in first position of its cycle of rotation to a second position of its said cycle, said cam having a high dwell, a timer motor controlled by said second switch, a shaft driven by said motor, said cam oscillatable on said shaft, means biasing said cam against the direction of rotation of said shaft, stop means limiting motion of said cam relative to said shaft, a switch arm controlling said second switch shaped with an angular portion, said high dwell engaging said angular portion when said cam is in first position to open said second switch, said high dwell engaging a different portion of said switch arm to close said second switch and start said motor, said motor wired to advance said cam from second position back to first position once said second switch is closed.

7. A device for use in a coin-operated laundry, or the like, a central console, a plurality of laundry machines, a selective first switch at said console to establish communication between said console and a selected machine, each said machine provided with a second switch mechanism having a second switch closed by energy from said console and when closed commencing operation of said machine, and a coin operated switch mechanism at said console, said last-named mechanism comprising a coin deposit slot, manually operated means, and a third switch arranged to be closed upon actuation of said manually operated means when a coin has been deposited in said slot, said first and third switches wired in series to control closing said second switch, said second switch when closed controlling actuation of said selected machine, said second switch mechanism comprising a timer motor controlled by said second switch, a shaft turned by said motor, a cam having a plurality of ratchet teeth rotatable about said shaft, a lost-motion drive connection between said shaft and cam whereby said cam can turn in advance of said shaft in the direction of rotation of said shaft, a switch controlling said motor having a switch arm projecting in the path of said cam and arranged to close said switch as each said tooth engages said arm, a solenoid, and a pawl moved by said solenoid, said pawl positioned to advance said cam one tooth each time said solenoid is energized, said pawl located to move said tooth against said arm and retain said switch closed until said shaft turns a sufficient distance to take up said lost motion connection to move said cam away from said arm.

8. A mechanism according to claim 7 in which said arm is shaped complementary to said ratchet teeth, whereby said arm restrains reverse movement of said cam.

9. A mechanism according to claim 7 in which said lost-motion connection comprises a first pin rotatable with said shaft and disposed radially thereto and a second pin on said cam in the path of rotation of said first pin.

References Cited by the Examiner
UNITED STATES PATENTS

| | | | |
|---|---|---|---|
| 2,134,185 | 10/1938 | Hansen | 194—92 |
| 2,392,511 | 1/1946 | Thompson et al. | 194—10 |
| 2,672,969 | 3/1954 | Greenwald | 194—9 |
| 2,885,050 | 5/1959 | Haverstick | 194—9 |
| 2,924,320 | 2/1960 | Greenwald | 194—84 |
| 2,973,077 | 2/1961 | Crockett | 194—84 |
| 2,979,580 | 4/1961 | Timm | 200—38 |
| 3,042,762 | 7/1962 | Palladino | 200—38 |
| 3,076,107 | 1/1963 | Johnston. | |
| 3,110,385 | 11/1963 | Eickhoff | 194—84 |
| 3,140,766 | 7/1964 | Taylor | 194—84 |

SAMUEL F. COLEMAN, *Primary Examiner.*